United States Patent
Tune et al.

(10) Patent No.: US 12,174,738 B2
(45) Date of Patent: Dec. 24, 2024

(54) CIRCUITRY AND METHOD

(71) Applicant: Arm Limited, Cambridge (GB)

(72) Inventors: Andrew David Tune, Dronfield (GB);
Sean James Salisbury, Dendron (GB);
Edward Martin McCombs, Jr.,
Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/885,780

(22) Filed: Aug. 11, 2022

(65) Prior Publication Data
US 2024/0054073 A1 Feb. 15, 2024

(51) Int. Cl.
*G06F 12/0802* (2016.01)

(52) U.S. Cl.
CPC ...... *G06F 12/0802* (2013.01); *G06F 2212/60* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048;
(Continued)

(56) References Cited

U.S. PATENT DOCUMENTS 4,047,161 A * 9/1977 Davis ...................... G06F 9/462
710/264
5,067,078 A * 11/1991 Talgam ............... G06F 12/1054
365/49.1

(Continued)

OTHER PUBLICATIONS

The Basics of Caches; Garcia, Sat; Dec. 24, 2020; retrieved from https://web.archive.org/web/20201224222547/https://cseweb.ucsd.edu/classes/su07/cse141/cache-handout.pdf on Sep. 29, 2023 (Year: 2020).*
(Continued)

*Primary Examiner* — Daniel C. Chappell
(74) *Attorney, Agent, or Firm* — Leveque Intellectual Property Law, P.C.; Renee Michelle Leveque

(57) ABSTRACT

Circuitry including cache storage and control circuitry is provided. The cache storage includes an array of random access memory storage elements, and is configured to store data in multiple cache sectors, each cache sector including a number of cache storage data units. The control circuitry is configured to control access to the cache storage including, for example, accessing the cache storage data units in the cache sectors. After accessing a cache storage data unit in a cache sector, the energy requirement and/or latency for the next access to a cache storage data unit in the same sector is lower than the energy requirement and/or latency for the next access to a cache storage data unit in a different same sector.

20 Claims, 4 Drawing Sheets

(58) Field of Classification Search
CPC ............... G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | | |
|---|---|---|---|---|
| 5,410,669 | A * | 4/1995 | Biggs | G06F 12/0802 |
| | | | | 711/E12.017 |
| 5,687,131 | A * | 11/1997 | Spaderna | G06F 12/0891 |
| | | | | 365/230.01 |
| 6,233,655 | B1 * | 5/2001 | Shum | G06F 9/30043 |
| | | | | 711/E12.047 |
| 6,628,566 | B2 | 9/2003 | Jeong | |
| 9,740,631 | B2 * | 8/2017 | Shiu | G06F 3/0604 |
| 2007/0153584 | A1 | 7/2007 | Mohammad et al. | |
| 2010/0128550 | A1 | 5/2010 | Lovett | |
| 2017/0357597 | A1 * | 12/2017 | Tune | G06F 12/121 |
| 2018/0052599 | A1 * | 2/2018 | Arimilli | G06F 12/0897 |
| 2018/0052608 | A1 * | 2/2018 | Arimilli | G06F 9/30032 |
| 2018/0052688 | A1 * | 2/2018 | Arimilli | G06F 12/0879 |
| 2018/0137053 | A1 * | 5/2018 | Kryukov | G06F 12/0842 |
| 2020/0004535 | A1 * | 1/2020 | Yap | G06F 9/345 |
| 2024/0055034 | A1 | 2/2024 | Mccombs, Jr. | |
| 2024/0055035 | A1 | 2/2024 | Mccombs, Jr. | |
| 2024/0055047 | A1 | 2/2024 | Mccombs, Jr. et al. | |

OTHER PUBLICATIONS

The Hell of Caches; Rodgers et al.; Oct. 13-16, 2010; retrieved from https://web.archive.org/web/20101013063833/http://www.cs.umd.edu/~meesh/cmsc411/website/projects/outer/hoc/cache.htm on Sep. 29, 2023 (Year: 2010).*

Exploiting Temporal Locality in Drowsy Cache Policies; Petit et al.; CF'05; May 4-6, 2005 (Year: 2005).*

K. Flautner, Nam Sung Kim, S. Martin, D. Blaauw and T. Mudge, "Drowsy caches: simple techniques for reducing leakage power," Proceedings 29th Annual International Symposium on Computer Architecture, Anchorage, AK, USA, 2002, pp. 148-157, doi: 10.1109/ISCA.2002.1003572. (Year: 2002).*

Y. Liu, X. Ge, X. Huang and D. H. C. Du, "MOLAR: A cost-efficient, high-performance hybrid storage cache," 2013 IEEE International Conference on Cluster Computing (CLUSTER), Indianapolis, IN, USA, 2013, pp. 1-5, doi: 10.1109/CLUSTER.2013.6702613. (Year: 2013).*

J. Zebchuk, H. W. Cain, X. Tong, V. Srinivasan and A. Moshovos, "RECAP: A region-based cure for the common cold (cache)," 2013 IEEE 19th International Symposium on High Performance Computer Architecture (HPCA), Shenzhen, China, 2013, pp. 83-94, doi: 10.1109/HPCA.2013.6522309. (Year: 2013).*

Srinivasan, Viji & Charney, Mark & Davidson, Edward & Tyson, Gary. (2000). SpliCS—Split Latency Cache System. (Year: 2000).*

Nakamura et al., "A 500-MHz 4-Mb CMOS pipeline-burst cache SRAM with point-to-point noise reduction coding I/O," IEEE Journal of Solid-State Circuits, vol. 32, No. 11, pp. 1758-1765, Nov. 1997 (DOI: 10.1109/4.641698).

Sato et al., "A 500-MHz pipelined burst SRAM with improved SER immunity," IEEE Journal of Solid-State Circuits, vol. 34, No. 11, pp. 1571-1579, Nov. 1999 (DOI: 10.1109/4.799865).

Augustine et al., "2X-Bandwidth Burst 6T-SRAM for Memory Bandwidth Limited Workloads", 20 IEEE Symposium on VLSI Circuits, Jun. 16-19, 2020 (DOI: 10.1109/VLSICircuits18222.2020).

* cited by examiner

CIRCUITRY AND METHOD

BACKGROUND

This disclosure relates to data processing.

Cache memory circuitry is used between, for example, data processing circuitry and a main memory, to provide temporary storage of data items used (or expected to be used) by the data processing circuitry. Cache memory circuitry is typically smaller than, and faster than, the main memory.

It is in this context that the present disclosure arises.

SUMMARY

In an example arrangement there is provided circuitry comprising control circuitry to control access to cache storage comprising an array of random access memory storage elements, the cache storage being configured to store data as cache storage data units; where the cache storage comprises multiple cache sectors each comprising m cache storage data units, where m is an integer greater than 1, the cache storage being configured so that following access to a given cache storage data unit in a given cache sector, when a next access is to another cache storage data unit within the given cache sector, an energy requirement and/or latency for that next access is lower than when the next access is to a cache storage data unit in a cache sector different to the given cache sector; the control circuitry being configured to control the storage of a data unit having an associated memory address to a cache storage data unit selected from a set of n cache storage data units applicable to that memory address, where n is equal to an integer multiple of at least two times m, and each set of n cache storage data units comprises at least two cache sectors; where the control circuitry is configured to control writing of a group of data units for which the memory addresses associated with those data units have a predetermined relationship and for which a given set of cache storage data units are applicable to those memory addresses, to the same cache sector of the given set of cache storage data units.

In another example arrangement there is provided a method comprising storing cache data as cache data storage units by an array of random access memory storage elements comprising multiple cache sectors each comprising m cache storage data units, where m is an integer greater than 1, and configured so that following access to a given cache storage data unit in a given cache sector, when a next access is to another cache storage data unit within the given cache sector, an energy requirement and/or latency for that next access is lower than when the next access is to a cache storage data unit in a cache sector different to the given cache sector; and controlling access to the cache storage, comprising controlling the storage of a data unit having an associated memory address to a cache storage data unit selected from a set of n cache storage data units applicable to that memory address, where n is equal to an integer multiple of at least two times m, and each set of n cache storage data units comprises at least two cache sectors; where the controlling step comprises controlling writing of a group of data units for which the memory addresses associated with those data units have a predetermined relationship and for which a given set of cache storage data units are applicable to those memory addresses, to the same cache sector of the given set of cache storage data units.

Further respective aspects and features of the disclosure are defined by the appended claims.

BRIEF DESCRIPTION OF THE DRAWINGS

The present technique will be described further, by way of example only, with reference to embodiments thereof as illustrated in the accompanying drawings, in which.

DETAILED DESCRIPTION

Circuitry Overview

Figure 1:
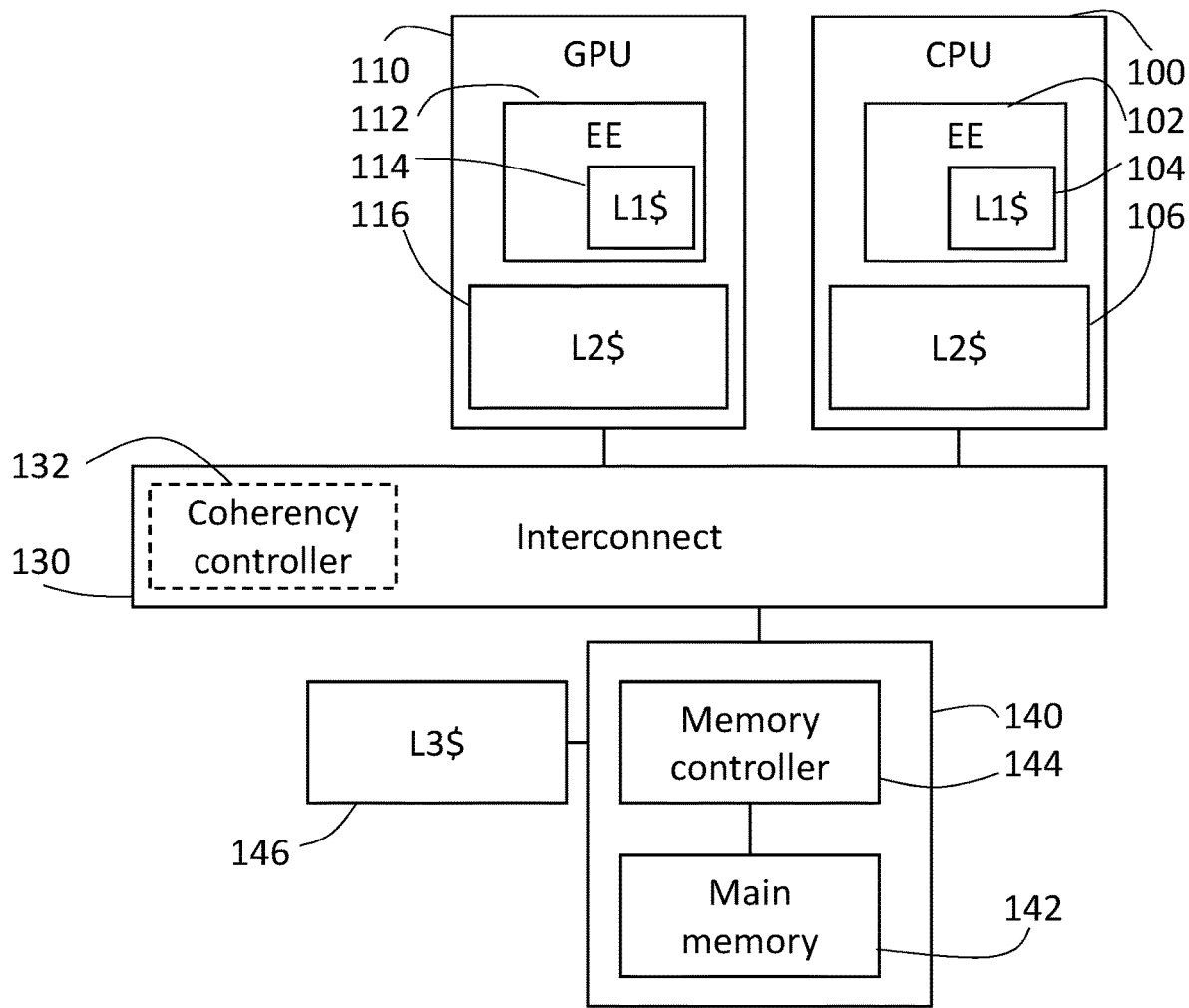
FIG. 1 schematically illustrates an example data processing circuitry.

FIG. 1 schematically illustrates an example of data processing circuitry comprising a central processing unit (CPU) 100 as an example of processing circuitry, a graphics processing unit (GPU) 110 (as another example of processing circuitry), interconnect circuitry 130 and a main memory 140.

In operation, each of the CPU 100 and the GPU 110 may perform respective processing tasks. One or more other devices falling in this definition may be provided. For example, tasks performed by the CPU 100 may relate to control operations and tasks performed by the GPU 110 may relate to data handling operations such as image or video data rendering. However, this is just one example and other types of operations may be performed. Indeed, the use of a CPU 100 and GPU 110 is also just one schematic example and other types of and/or numbers of processors may be employed.

In the example shown, each of the CPU 100 and the GPU 110 comprises respective execution engine (EE) circuitry 102, 112 having an associated level 1 cache memory (abbreviated to L1$ in the diagram) 104, 114 and an associated level 2 cache memory (L2$) 106, 116. The main memory 140 comprises memory circuitry 142, a memory controller 144 to control access to and from the memory circuitry 142 and is associated with a level 3 cache memory (L3$) 146, also referred to as a system level cache (SLC).

The various cache memories shown in FIG. 1 form a cache arrangement such as a hierarchy, so that if a respective execution engine circuitry 102, 112 requires access to a data item (which may represent a processing instruction and/or data to be handled by a processing instruction) it will try first to obtain or access that data item in the respective level 1 cache memory. In the case of a cache miss a search will be performed through the next closest cache memory levels, with an access to the memory circuitry 142 of the main memory being used only if the attempted cache memory accesses all miss. When the required data item is obtained from the memory circuitry 142 a copy may be saved in one or more of the cache memories. It is noted however that multiple cache memories or levels are not a requirement of the present examples, and indeed the cache arrangement could simply comprise the SLC under discussion here.

In general terms, the level 1 cache memory is normally implemented to be electrically close to the respective processing circuitry and (in part due to its proximity) to provide rapid (low latency) and potentially energy efficient access to data stored by that cache memory. In previously proposed examples, the level 2 cache memory may be electrically further from the respective processing circuitry but may also be larger than the level 1 cache memory, and the level 3 cache memory may be electrically further still (though closest, in the hierarchy, to the main memory) but also potentially larger still than the level 2 cache memory. It is also noted that in the example of FIG. 1, the CPU 100 and the GPU 110 each have their own respective level 1 and level 2 cache memories, though one or both of these could instead be resources which are shared between multiple processing circuitries.

Accessing data from a cache memory can not only reduce memory latency, it can also reduce memory access power consumption compared to accessing the same data from latter layers of the memory system such as the main memory 140.

The interconnect circuitry 130 provides for data and other communication between the various nodes 100, 110, 140 connected to the interconnect circuitry. The interconnect circuitry may also optionally provide a coherency controller 132. In such example arrangements, the interconnect circuitry may be an example of so-called cache coherent interconnect circuitry. Here, the term "coherent" refers to the maintenance of a correct relationship between multiple copies of the same data stored across the whole system. For example, data may be stored in a memory device (such as a L1$ or L2$ at one of the data handling nodes (such as the CPU 100). Other nodes (such as the GPU 110) may (as described) have their own respective caches which, depending on the nature of the processing element operations, may store one or more copies of data which is also held at the CPU 100. In the case of a data handling access by one node to such information, there is a need to ensure that the accessing node is accessing the latest version of the stored information, and that if it makes any alteration to the stored information, either the other versions are correctly altered themselves or the other versions are deleted or invalidated. The interconnect circuitry 130 and potentially circuitry in the coherent caches may include various mechanisms and circuitry to provide for such coherent operation.

Note that in FIG. 1, a single interconnect is shown. However, in other embodiments there may be multiple interconnects, and indeed multiple main memories.

Example embodiments relate to operation of at least a part of the hierarchy of cache storage and in some particular examples, to the operation of the level 3 cache (SLC) 146. In example arrangements, this is implemented as cache storage comprising an array of random access memory storage elements, the cache storage being configured to store data as cache storage data units such as cache lines. Aspects of this arrangement will be discussed further below.

FIG. 1 therefore shows an example of circuitry comprising circuitry to perform memory accesses (such as processing circuitry 100, 110); a main memory 140; a cache arrangement 104, 114, 106, 116, 146 comprising the cache storage (such as the SLC) disposed in a data path between the processing circuitry 100, 110 and the main memory 140; where the cache storage comprises a system level cache 146 disposed closest in the data path, with respect to the hierarchy of cache levels, to the main memory 140.

Cache Memory Terminology

Each of the cache memories discussed in connection with FIG. 1 can for example be implemented as a set-associative cache memory, though other types of organization such as fully associative can be used. In such a cache memory, a cache storage data unit such as a so-called cache line (for example, of eight words, where a word may relate for example to a 16-bit, 32-bit, 64-bit or other bit quantity) is stored at a location which depends upon the memory address range represented by that cache line, but for each such memory address, there is a potential mapping to any of a set of locations or "ways", and each set of locations is mapped to multiple memory addresses. A cache controller is responsible for managing the population of the cache memory, in terms of providing (or "allocating") a location to store a newly received cache line, which may involve evicting an already-stored cache line, with the evicted cache line being selected according to a cache replacement policy managed by the cache controller.

Figure 2:
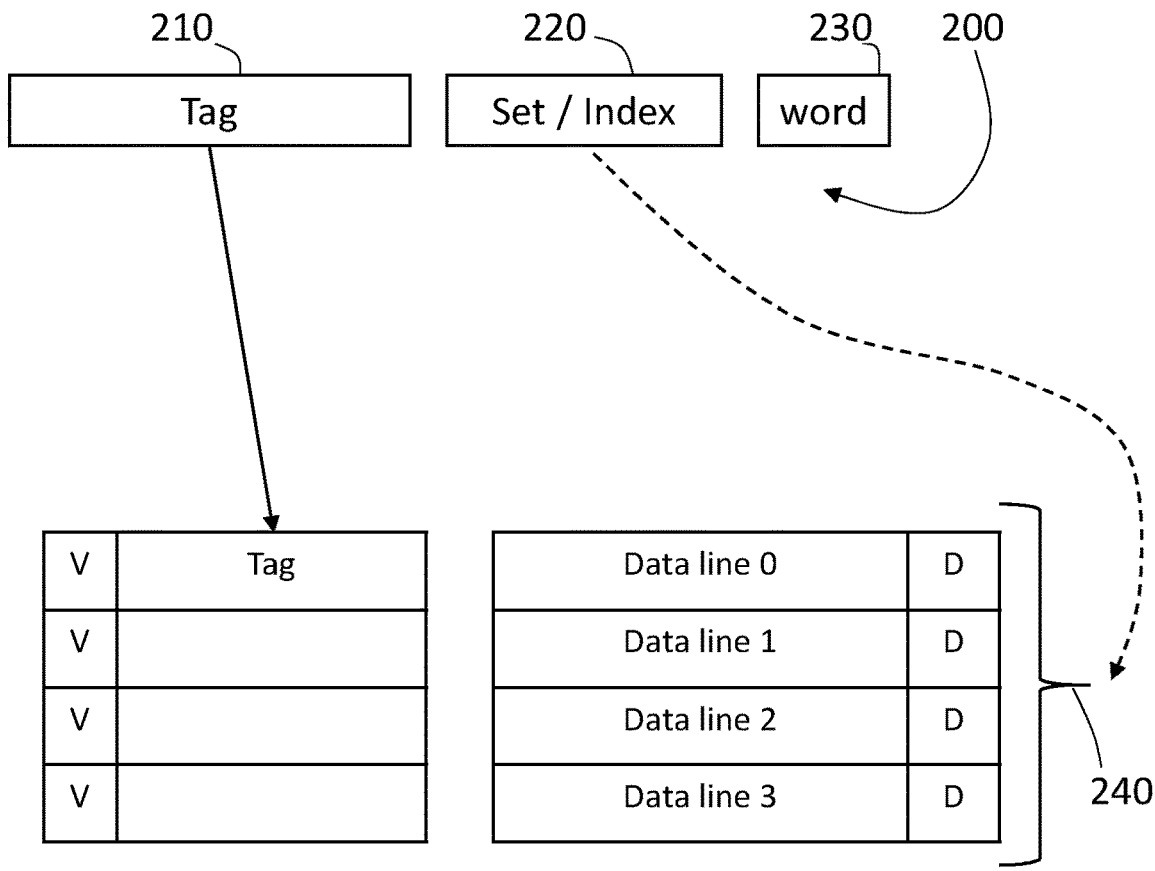
FIG. 2 schematically illustrates example storage operations.

With reference to FIG. 2, a memory address 200 indicative of a given cache line may be treated as a portion 210 called a tag, a portion 220 defining which set of locations is applicable to that memory address (for example, directly or via a hash function) and a portion 230 defining an individual word within the cache line. In example arrangements, the set or index 220 chooses a set of storage locations 240 as drawn in FIG. 2 (with an example associativity or number of locations per set of 4); and the tag 210 is stored in a location selected by the cache controller within that set alongside the actual data contents of the cache line (for example Data line 0). The storage "alongside" is conceptual—a separate storage array or area may be used. A "valid" flag V may be provided to indicate that valid data stored in a particular way; and a "dirty" flag D may be used to indicate that the data contents now differ from those stored in the main memory, for example by virtue of a write operation having taken place, and should be written back to the main memory at the appropriate stage. Replacement policy related information may be stored; other information such as cache coherency state and/or ECC bits may also be stored.

The use of the portion 220 provides an example where cache control circuitry is configured to select a set of n cache storage units applicable to a memory address in dependence upon a predetermined portion of the line's memory address.

As discussed, the cache control circuitry may be configured to control storage of tag data indicative of one or more portions of the address other than the predetermined (index) portion 220.

In order to retrieve a cache line corresponding to a particular required address from the cache memory, the index or set identification is obtained by the cache controller as or in dependence upon a portion of that memory address. The set of locations defined by that index is accessed and the tag is read from each such location. A required tag is derived from the required address and is compared with the retrieved tag obtained from each of the set of locations. A match indicates that the data stored at that location represents the required cache line.

A cache controller operating according to these principles (not shown in FIG. 2 but to be described below with reference to FIGS. 5 and 6) provides an example of control circuitry to control access (such as set-associative access) to the cache storage, the control circuitry being configured to control the storage of a data unit having an associated memory address to a cache storage data unit selected from a set of n cache storage data units applicable to that memory address, where n is equal to an integer multiple of at least two times m, and each set of n cache storage data units comprises at least two cache sectors.

DRAM Main Memory

Figure 3:
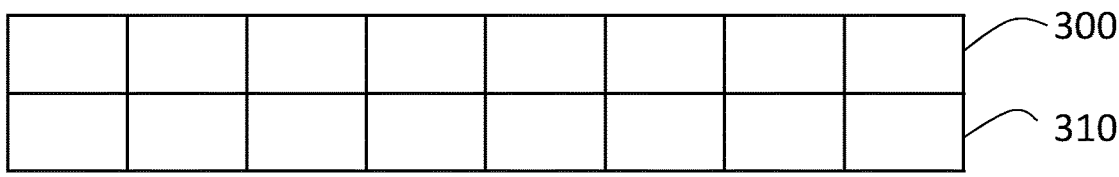
FIG. 3 schematically illustrates an aspect of a DRAM.

In the present examples, the main memory is implemented as a dynamic random access memory, DRAM, comprising multiple DRAM banks, each bank having DRAM sectors each storing a plurality of data units, the DRAM being configured so that following access to a given data unit in a given DRAM sector in a given DRAM bank, when a next access is to another data unit within the given DRAM sector in that DRAM bank, an energy requirement and/or latency for that next access is lower than when the next access is to a data unit in a DRAM sector different to the given DRAM sector. This property relates to the way where DRAM operates, and as shown schematically in FIG. 3, the main memory DRAM is configured to operate as a series of pages 300, 310 . . . where multiple simultaneous or directly successive accesses to a single page (that is to say, without an intervening access to a different page) can result in a reduced energy consumption and/or latency when compared with multiple accesses to respective different pages. Note that the DRAM can in fact make intervening accesses to a different page, as long as the access does not require closing the present page, in the situation that the access to that different page relates to a different DRAM bank.

For this reason, at least some previously proposed SLC arrangements (being the part of the cache memory hierarchy just upstream of the main memory) can make use of so-called write gathering or write combining where the SLC provides logic and/or circuitry to group together data writes back to the main memory in order to aim to provide multiple accesses to the same DRAM page to the extent possible.

SRAM SLC

Figure 4:
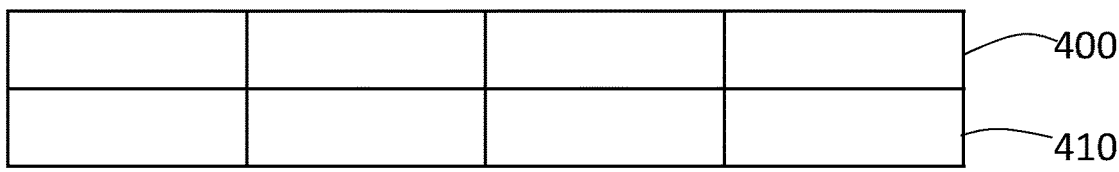
FIG. 4 schematically illustrates an aspect of an SRAM.

In the present examples, the SLC or level 3 cache 146 is implemented by static random access memory (SRAM) where a similar property to that exhibited by the DRAM main memory is provided, namely that the SRAM is also arranged as sectors 400, 410 . . . (FIG. 4), with data accesses within a sector being preferential to successive data accesses to different sectors. In some examples, the size of a sector, for example storing four cache lines, may be somewhat smaller than the page size of the DRAM main memory and indeed may be smaller than the associativity of the SLC (for example, 16 or 32 cache lines). Note that the present disclosure is not restricted to static RAM; other types of RAM such as DRAM may be used.

This provides an example of cache storage comprising multiple cache sectors 400, 410 each comprising m cache storage data units, where m is an integer greater than 1, the cache storage being configured so that following access to a given cache storage data unit in a given cache sector, when a next access is to another cache storage data unit within the given cache sector, an energy requirement and/or latency for that next access is lower than when the next access is to a cache storage data unit in a cache sector different to the given cache sector.

At least one memory suitable for use in the present embodiments is described in U.S. patent application Ser. No. 17/885,709 (entitled "Burst Read With Flexible Burst Length For On-Chip Memory," filed concurrently herewith), Ser. No. 17/885,747 (entitled "Dynamic Way-Based Variable Pipeline Architecture For On-Chip Memory," filed concurrently herewith), and Ser. No. 17/885,753 (entitled "Dynamic Power Management For On-Chip Memory," filed concurrently herewith), the contents of which are incorporated herein by reference in their entireties.

Example Cache Control Techniques

Figure 5:
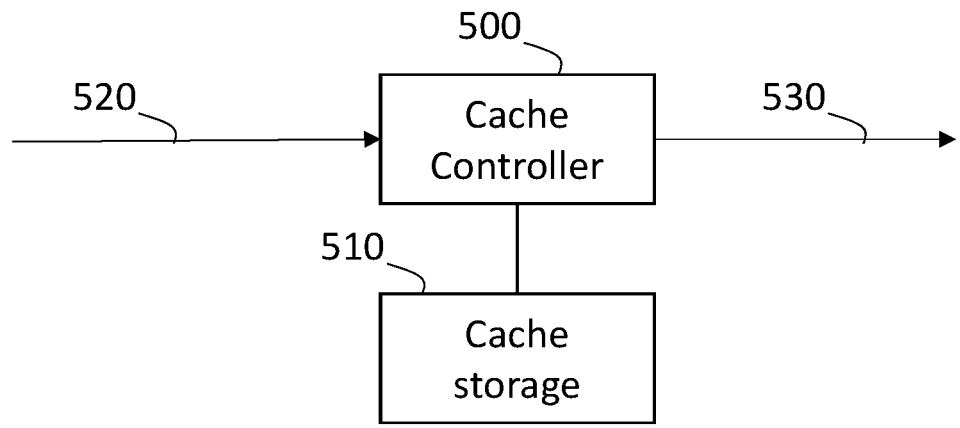
FIG. 5 schematically illustrates aspects of a cache memory.

FIG. 5 schematically illustrates a cache controller 500 interacting with cache storage 510. Data lines 520 to be cached are provided to the cache controller 500 which selects a location within the cache storage 510 and controls the storage of the data lines to the cache storage 510. Data lines to be read from the cache memory are retrieved from their location by the cache controller 500 and provided as output data 530.

In example embodiments, the cache control circuitry is configured to control writing of a group of data units for which the memory addresses associated with those data units have a predetermined relationship and for which a given set of cache storage data units are applicable to those memory addresses, to the same cache sector of the given set of cache storage data units.

Example—Potentially Increasing Cache Storage Performance

In some examples, the present techniques can install or write cache lines to the SRAM cache storage in such a way as to potentially improve the efficiency which will be obtained when those cache lines are read out.

As discussed above, the SRAM cache storage is arranged as sectors such that multiple accesses within a sector can be more efficient in terms of energy consumption and/or latency compared with multiple accesses across different sectors.

In example designs, the size of a sector (for example, 4 cache lines) may be smaller than the size of a set (for example, 8 or 16 cache lines). The cache operation techniques discussed above would choose a cache line within a set for each newly allocated line but further actions may be used to provide for a potentially useful choice of which sector within a set is used for a given cache line.

A potential improvement can be obtained by storing cache lines to sectors in such a way that they are organized appropriately for their likely use when they are subsequently read out. In example arrangements, this involves preferentially grouping together within a sector cache lines for which the associated memory addresses have a predetermined relationship. An example of such a relationship is that the cache lines have adjacent memory addresses or at least adjacent portions of their memory addresses.

When a first cache line is written to a particular set, an arbitrary choice can be made as to which location or way it is stored in. However, when a second or subsequent line having the predetermined relationship is to be stored, a potential advantage can be obtained by preferentially storing it in the same sector as the initial cache line. Therefore, in example arrangements, the cache control circuitry is configured, in response to initiation of writing of a data unit having a given memory address to the cache storage, to detect whether the set of cache storage data units applicable to the given memory address already stores one or more other data units for which the memory addresses associated with those data units have the predetermined relationship with the given memory address.

The outcome of this test may be as follows. When the set of cache storage data units applicable to the given memory address already stores one or more other data units for which the memory addresses associated with those data units have the predetermined relationship with the given memory address, the control circuitry is configured to select an available cache storage data unit a cache sector storing the one or more other data units. However, when the set of cache storage data units applicable to the given memory address stores no other data unit for which the memory addresses associated with those data units have the predetermined relationship with the given memory address, the control circuitry is configured to select an available cache storage data unit of the set of n cache storage data units.

Such a selection does not have to be deterministic in the sense that anything stored in the same sector would automatically be evicted in order to achieve the energy and/or latency advantages discussed above; on the contrary, in some circumstances important and/or frequently used data may already be stored in that sector. So, in example arrangements the detection just discussed can be used to steer, rather than to control deterministically, the selection of a location to store a newly allocated cache line. Similarly, in the case of a first cache line of a potentially related group to be stored, the cache controller can steer this towards a sector which does not store data flagged or considered as important and/or frequently used so as to alleviate this potential issue.

Using these techniques, in at least some situations the efficiency of operation of the SRAM cache memory storage can be improved, independently of whatever is upstream or downstream of that cache memory storage. In their broadest aspect, therefore, the techniques are applicable to any of the cache memories although the present examples relate to the SLC.

Example—Interaction with Writeback to Main DRAM Memory

The techniques discussed above, relating to storage organization purely with reference to the SRAM cache memory itself, may provide useful advantages. However, it is possible that at least some of the power and/or latency advantages provided by this technique may be negated by increased power and/or latency resulting from the process to write data back to the DRAM main memory.

Therefore, in further examples, the selection of the predetermined relationship to control storing of cache lines in a common SRAM sector may actually depend upon a predetermined relationship such that the memory addresses associated with the group of data units are in the same DRAM sector or page (noting, as mentioned above, that a DRAM page is typically larger than an SRAM sector).

In some examples, a weighting scheme can be used. As mentioned above, the cache controller 500 performs the allocation of new cache lines, and the eviction of any so-called victim lines which need to be cleared to make space for a newly allocated cache line, according to a cache replacement policy. Examples of such policies include least recently used (LRU), single re-reference interval prediction (SRRIP) and the like. Any of these policies will rank already-stored cache lines according to their suitability for eviction. A further waiting can be applied to this ranking in dependence upon a prediction of a cost function (which may in turn depend upon energy consumption and/or latency) applicable to the operation of the SRAM cache storage itself and/or the subsequent operation when that data is written back to the main memory. For example, the cost function may be a deterministic function of one or more of (i) how many other cache lines having the predetermined address relationship are already stored by a sector; and (ii) potential performance improvements obtained at subsequent writeback when multiple lines are retrieved from SRAM together and are written back to DRAM together. The cache controller can operate such that when the weightings predict that a significant net gain cannot be obtained, the system falls back to operation under the existing cache replacement policy. But when a significant net gain can be obtained, the weighting steers the cache replacement policy towards improving the chance of obtaining that net gain.

In other words, the cache control circuitry may be configured to control writing of a data unit in response to a cache writing policy which associates a respective selection criterion with the set of n cache storage data units applicable to the memory address of a data unit to be stored. For example, the cache control circuitry may be responsive to a respective cost factor associated with the set of n cache storage data units applicable to the memory address of a data unit to be stored. In examples, the cost factor for a cache storage data unit is indicative of an energy and/or latency cost associated with storing the data unit by that cache storage data unit.

Cache Controller Example

Further information will now be provided relating to so-called write combining or write gathering techniques. Here, the cache control circuitry is configured to selectively perform data write operations from the cache memory to the main memory as a group of data writes, for example when the group of data writes relate to memory addresses in the same DRAM sector or page.

Figure 6:
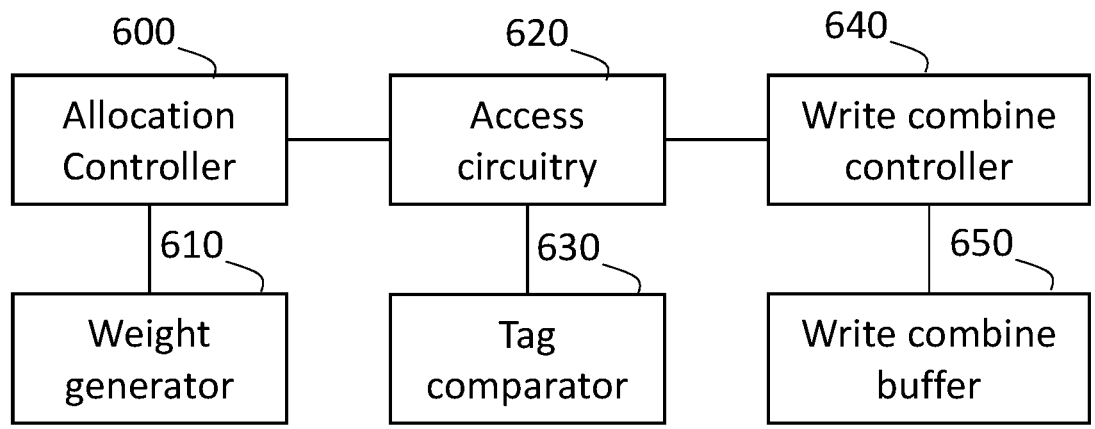
FIG. 6 schematically illustrates a cache controller.

Referring to FIG. 6, aspects of the cache controller 500 are shown. An allocation controller 600 performs cache line allocation using the techniques described above, for example in combination with a weight generator 610 which generates the weightings to potentially modify the cache replacement policy in the manner described above. Access circuitry 620 controls access to the cache storage 510 and interacts with tag comparator circuitry 630 which performs the tag comparison described above.

A write controller 640 interacts with a so-called write combine buffer (WCB) 650. This allows for the grouping or gathering of data writes from the cache storage 510 to main memory so that individual DRAM pages or sectors are accessed less frequently but for greater numbers of cache lines to be stored, potentially providing the efficiency improvements described above.

Note that there does not necessarily have to be a WCB; instead, the relevant lines could simply be grouped together and sent to the memory controller of the DRAM. It is also noted that a memory controller would normally have a WCB, so the functionality described here could be implemented by cooperation between the write controller 640 and the WCB of the memory controller.

Tag Example

In the example described with reference to FIG. 2, the tag data stored with a cache line and used at retrieval to detect whether the correct cache line has been retrieved from a set of ways comprises at least one (for example, at least two) least significant bits of the address. One bit would be enough for a sector size of 2.

Figure 7:
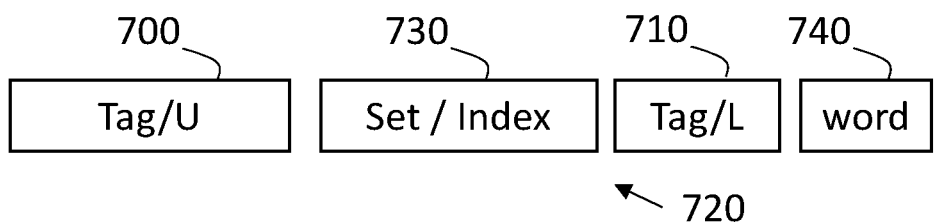
FIG. 7 schematically illustrates the use of tag data.

In a further example shown schematically in FIG. 7, the tag data comprises at least one (for example as drawn, at least two) further bits of the address separated by one or more bits from the at least one (for example, at least two) least significant bits. In other words, the tag is formed of an upper tag portion (tag/U) 700 and a lower tag portion (tag/L) 710 separated within the address 720 by the set index 730. At retrieval from the cache memory, a match is required for both the upper and lower tag portions. At the stage of storage to the cache memory, this arrangement provides that address is having any value of the lower tag portion 710 will be written to the same set, which in turn can provide for adjacent memory address is being stored to the same sector.

Underlying this technique is that the index will normally have a coarser granularity—that of the sector rather than that of the cache line. Therefore, in this arrangement, all of the cache lines with the same sector address will map to the same cache index (hence, set). The cache index would therefore change at an address granularity of (say) 256 Bytes rather than 16 Bytes (one cache line) in a comparative standard cache system.

Other examples, when using a more standard index/tag arrangement, could include (i) looking up multiple lines in the cache to determine whether another cache line in a sector is already allocated, and/or (ii) providing auxiliary storage to identify the locations of related cache lines in a sector.

Summary Method

Figure 8:
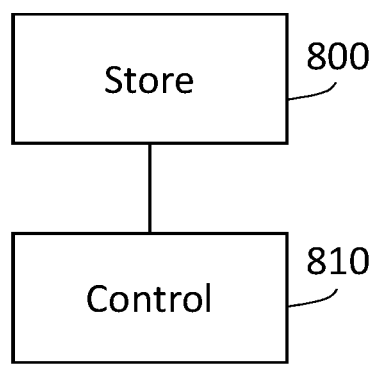
FIG. 8 is a schematic flowchart illustrating a method.

FIG. 8 is a schematic flowchart illustrating a method comprising storing (at a step 800) cache data as cache data storage units by an array of random access memory storage elements comprising multiple cache sectors each comprising m cache storage data units, where m is an integer greater than 1, and configured so that following access to a given cache storage data unit in a given cache sector, when a next access is to another cache storage data unit within the given cache sector, an energy requirement and/or latency for that next access is lower than when the next access is to a cache storage data unit in a cache sector different to the given cache sector; and controlling (at a step 810) access to the cache storage, comprising controlling the storage of a data unit having an associated memory address to a cache storage data unit selected from a set of n cache storage data units applicable to that memory address, where n is equal to an integer multiple of at least two times m, and each set of n cache storage data units comprises at least two cache sectors; where the controlling step comprises controlling writing of a group of data units for which the memory addresses associated with those data units have a predetermined relationship and for which a given set of cache storage data units are applicable to those memory addresses, to the same cache sector of the given set of cache storage data units.

In examples the controlling step may be performed by the cache controller 500, and the storing step by the cache storage 510.

General Matters

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

What is claimed is:

1. Circuitry, comprising:
control circuitry configured to control access to cache storage in an array of random access memory storage elements of a static random access memory, the cache storage being configured to store data as cache storage data units, the static random access memory comprising multiple storage sectors, where each storage sector of the multiple storage sectors comprises m cache storage data units, where m is an integer greater than 1, the static random access memory being configured so that following access to a given cache storage data unit within a given storage sector of the multiple storage sectors, when a next access is to another cache storage data unit within the given storage sector, an energy requirement or latency for that next access is lower than the energy requirement or latency when that next access is instead to a cache storage data unit within a storage sector of the multiple storage sectors, that is different from the given storage sector;
the control circuitry being configured to control storage of a data unit having an associated memory address to a cache storage data unit selected from a set of n cache storage data units applicable to that memory address, where n is equal to an integer multiple of at least two times m, and the set of n cache storage data units comprises at least two storage sectors of the multiple storage sectors;
where the control circuitry is configured to control writing of a group of data units for which the memory addresses associated with those data units have a predetermined relationship and for which a given set of cache storage data units are applicable to those memory addresses, to the same storage sector of the at least two storage sectors.

2. The circuitry according to claim 1, where the predetermined relationship is such that the memory addresses associated with those data units are within a predetermined threshold separation of one another.

3. The circuitry according to claim 1, where the predetermined relationship is such that the memory addresses associated with those data units are adjacent memory addresses.

4. The circuitry according to claim 1, where the control circuitry is configured, in response to initiation of writing of a data unit having a given memory address to the cache storage, to detect whether the set of cache storage data units applicable to the given memory address already stores one or more other data units for which the memory addresses associated with those data units have the predetermined relationship with the given memory address.

5. The circuitry according to claim 4, where when the set of cache storage data units applicable to the given memory address already stores one or more other data units for which the memory addresses associated with those data units have the predetermined relationship with the given memory address, the control circuitry is configured to select an available cache storage data unit a cache sector storing the one or more other data units.

6. The circuitry according to claim 4, where when the set of cache storage data units applicable to the given memory address stores no other data unit for which the memory addresses associated with those data units have the predetermined relationship with the given memory address, the control circuitry is configured to select an available cache storage data unit of the set of n cache storage data units.

7. The circuitry according to claim 1, where the control circuitry is configured to select the set of n cache storage units applicable to a memory address in dependence upon a predetermined portion of that memory address.

8. The circuitry according to claim 7, where the control circuitry is configured to control storage of tag data indicative of one or more portions of the address other than the predetermined portion.

9. The circuitry according to claim 8, where the tag data comprises at least one least significant bit of the address.

10. The circuitry according to claim 9, where the tag data comprises at least one further bit of the address separated by one or more bits from the at least two least significant bits.

11. The circuitry according to claim 1, where the control circuitry is configured to selectively perform data write operations from the cache storage data units in a cache sector to a main memory as a group of data writes.

12. The circuitry according to claim 1, further comprising:
circuitry to perform memory accesses;
a main memory; and
a cache arrangement comprising the cache storage and disposed in a data path between the circuitry to perform memory accesses and the main memory,
where the cache storage comprises a system level cache disposed closest in the data path, with respect to the cache arrangement, to the main memory.

13. The circuitry according to claim 12, where the main memory comprises a dynamic random access memory, DRAM, comprising multiple DRAM sectors each storing a plurality of data units, the DRAM being configured so that following access to a given data unit in a given DRAM sector, when a next access is to another data unit within the given DRAM sector, an energy requirement or latency for that next access is lower than when the next access is to a data unit in a DRAM sector different to the given DRAM sector.

14. The circuitry according to claim 13, where a DRAM sector is larger than a cache sector.

15. The circuitry according to claim 13, where the predetermined relationship is such that the memory addresses associated with the group of data units are in the same DRAM sector.

16. The circuitry according to claim 13, where the control circuitry is configured to control writing of a data unit in response to a cache writing policy which associates a respective selection criterion with the set of n cache storage data units applicable to the memory address of a data unit to be stored.

17. The circuitry according to claim 16, where the control circuitry is responsive to a respective cost factor associated with the set of n cache storage data units applicable to the memory address of a data unit to be stored.

18. The circuitry according to claim 17, where the cost factor for a cache storage data unit is indicative of an energy or latency cost associated with storing the data unit by that cache storage data unit.

19. The circuitry according to according to claim 1, where the array of random access memory storage elements comprises an array of static random access memory storage elements, and where the control circuitry is configured to control set-associative access to the cache storage.

20. A method, comprising:
storing cache data as cache data storage units by an array of random access memory storage elements of a static random access memory, the static random access memory comprising multiple storage sectors, where each storage sector of the multiple storage sectors comprises m cache storage data units, where m is an integer greater than 1, and configured so that following access to a given cache storage data unit within a given storage sector of the multiple storage sectors, when a next access is to another cache storage data unit within the given storage sector, an energy requirement or latency for that next access is lower than the energy requirement or latency when that next access is instead to a cache storage data unit within a storage sector of the multiple storage sectors different from the given storage sector; and
controlling access to the cache storage, comprising controlling storage of a data unit having an associated memory address to a cache storage data unit selected from a set of n cache storage data units applicable to that memory address, where n is equal to an integer multiple of at least two times m, and the set of n cache storage data units comprises at least two storage sectors multiple storage sectors of the multiple storage sectors;
where the controlling step comprises controlling writing of a group of data units for which the memory addresses associated with those data units have a predetermined relationship and for which a given set of cache storage data units are applicable to those memory addresses, to the same storage sector of the given at least two storage sectors.

* * * * *